US012151520B2

(12) United States Patent
Fu et al.

(10) Patent No.: US 12,151,520 B2
(45) Date of Patent: Nov. 26, 2024

(54) TIRE PRESSURE MONITORING MODULE, TIRE LOCALIZATION SYSTEM AND TIRE LOCALIZATION METHOD

(71) Applicant: NANJING SILERGY MICRO TECHNOLOGY CO., LTD., Jiangsu (CN)

(72) Inventors: Jiajie Fu, Causeway Bay (CN); Zhongjie Sun, Causeway Bay (CN); Chunbo Lin, Causeway Bay (CN); Chikang Liu, Causeway Bay (CN)

(73) Assignee: NANJING SILERGY MICRO TECHNOLOGY CO., LTD., Jiangsu (CN)

( * ) Notice: Subject to any disclaimer, the term of this patent is extended or adjusted under 35 U.S.C. 154(b) by 311 days.

(21) Appl. No.: 17/706,889

(22) Filed: Mar. 29, 2022

(65) Prior Publication Data
US 2022/0332152 A1 Oct. 20, 2022

(30) Foreign Application Priority Data
Mar. 30, 2021 (CN) .......................... 202110341618.4

(51) Int. Cl.
*B60C 23/04* (2006.01)
(52) U.S. Cl.
CPC ...... *B60C 23/0416* (2013.01); *B60C 23/0437* (2013.01)
(58) Field of Classification Search
CPC ............ B60C 23/0416; B60C 23/0437; B60C 23/0444; B60C 23/0486; B60C 23/0433; B60C 23/04
(Continued)

(56) References Cited

U.S. PATENT DOCUMENTS 10,457,103 B2 * 10/2019 Liu ..................... B60C 23/0489
10,737,541 B1 * 8/2020 Engl ................... B60C 23/0483
(Continued)

FOREIGN PATENT DOCUMENTS

CN 107031316 A 8/2017
CN 109808428 A 5/2019
FR 3090488 A1 * 6/2020 ......... B60C 23/0415

OTHER PUBLICATIONS

Chinese Office Action dated Aug. 3, 2022 for Chinese Appl. No. 202110341618.4.

*Primary Examiner* — Eric Blount
(74) *Attorney, Agent, or Firm* — Ohlandt, Greeley and Perle, L.L.P.

(57) ABSTRACT

A tire pressure monitoring module of a vehicle, a tire localization system and a tire localization method of a vehicle are provided. Each of tires is determined to be a left tire or a right tire based on a phase relationship of components of magnetic field intensity in two different directions in the tire. The components of magnetic field intensity in two different directions are measured by a magnetometer in the tire pressure monitoring module. The tire is determined to be a front tire or a right tire based on magnitude of an AOA of a first Bluetooth module in the tire pressure monitoring module relative to a multi-antenna Bluetooth host. In this way, the tires of the vehicle are positioned automatically with a high precision. In addition, the tire pressure monitoring module may be mounted on any tire without any distinction, which reduces the installation cost.

17 Claims, 5 Drawing Sheets

(58) Field of Classification Search
USPC .......................................................... 340/447
See application file for complete search history.

(56) References Cited

U.S. PATENT DOCUMENTS

| | | | |
|---|---|---|---|
| 2006/0012475 A1* | 1/2006 | Froitzheim | B60C 23/007 340/8.1 |
| 2007/0156312 A1* | 7/2007 | Breed | B60C 23/0408 701/31.4 |
| 2018/0312021 A1 | 11/2018 | Liu | |
| 2019/0152277 A1 | 5/2019 | Hassani et al. | |

* cited by examiner

TIRE PRESSURE MONITORING MODULE, TIRE LOCALIZATION SYSTEM AND TIRE LOCALIZATION METHOD

This application claims priority to Chinese Patent Application No. 202110341618.4, titled "TIRE PRESSURE MONITORING MODULE, TIRE LOCALIZATION SYSTEM AND TIRE LOCALIZATION METHOD", filed on Mar. 30, 2021 with the China National Intellectual Property Administration, which is hereby incorporated by reference in its entirety.

FIELD

The present disclosure relates to the technical field of vehicle monitoring, and in particular, to a tire pressure monitoring module of a vehicle, a tire localization system and a tire localization method of a vehicle.

BACKGROUND

In a conventional tire pressure monitoring system of a vehicle, a one-to-one correspondence between tire pressure monitoring modules and tire positions is required to be preset before the vehicle is delivered from a factory, resulting in inconvenience to the installation and debugging process. If a designated tire pressure monitoring module is accidentally not installed on a designated tire, the user may receive an incorrect tire pressure alarm signal, resulting in great safety hazards in long-distance driving.

According to a conventional technology for tire localization, Received Signal Strength Indication (RSSI) of Bluetooth is utilized for distance measuring, and the measured distance information is applied to an existing distance measurement model to perform a rough distance localization calculation. Such tire localization technology uses lots of Bluetooth anchor points, resulting in a slow calculation speed, a long localization delay, which is easily affected by environment, and is not accurate enough.

SUMMARY

In view of this, a tire pressure monitoring module, a tire localization system and a tire localization method of a vehicle are provided according to embodiments of the present disclosure. In the method, tires are determined to be a left tire or a right tire, based on a phase relationship of components of magnetic field intensity in two different directions, where the components of magnetic field intensity in two different directions are measured by a magnetometer in a tire pressure monitoring module. The tires are determined to be a front tire or a right tire, based on magnitudes of angles of arrival (AOA) of first Bluetooth modules in tire pressure monitoring modules relative to a multi-antenna Bluetooth host. In this way, an automatic positioning of tires of a vehicle is realized with a high precision. In addition, the tire pressure monitoring module may be mounted on any tire without any distinction, which reduces the installation cost.

In a first aspect of the present disclosure, a tire localization method for a vehicle is provided. The method includes:
matching a first Bluetooth module in each tire of the vehicle with a second Bluetooth module of a Bluetooth host in the vehicle;
acquiring first data sent by the first Bluetooth module in each tire, wherein the first data comprises data representing components of magnetic field intensity in at least two different directions in a corresponding tire;
obtaining an angle of arrival of the first Bluetooth module in each tire relative to the second Bluetooth module; and
locating each tire based on the first data and the angle of arrival.

In an embodiment, the tire localization method further includes:
determining, for each of the tires, whether a tire is a left tire or a right tire based on a phase relationship between an X-axis component of the magnetic field intensity and a Y-axis component of the magnetic field intensity in the tire.

In an embodiment, the tire localization method further includes:
acquiring, by the first Bluetooth module, multiple first data for a plurality of times at a preset time interval, to obtain information on change of the magnetic field intensity in one rotation of the tire corresponding to the first Bluetooth module, wherein the first data comprises data representing the X-axis component of the magnetic field intensity and the Y-axis component of the magnetic field intensity; and
determining, based on multiple first data, a phase relationship between the X-axis component of the magnetic field intensity and the Y-axis component of the magnetic field intensity.

In a further embodiment, the tire localization method further includes:
acquiring N pieces of the first data in one rotation of one tire, where N is a positive integer;
determining a position of an extreme point among N pieces of data representing the X-axis component of the magnetic field intensity; and
determining, for the N pieces of data representing the Y-axis component of the magnetic field intensity, whether a slope at a same position as the extreme point is a positive value or a negative value, wherein
if the slope is a positive value, it indicates that a phase of the X-axis component of the magnetic field intensity is ahead of a phase of the Y-axis component of the magnetic field intensity; and if the slope is a negative value, it indicates that the phase of the X-axis component of the magnetic field intensity lags behind the phase of the Y-axis component of the magnetic field intensity.

In an embodiment, the tire is determined to be a left tire in a case where a phase of the X-axis component of the magnetic field intensity is ahead of a phase of the Y-axis component of the magnetic field intensity; and the tire is determined to be a right tire in a case where the phase of the X-axis component of the magnetic field intensity lags behind the phase of the Y-axis component of the magnetic field intensity.

In an embodiment, the tire localization method further includes:
determining, for each of the tires, whether the tire is a front tire or a rear tire based on the angle of arrival corresponding to each tire.

In an embodiment, the tire localization method further includes:
transmitting, by a first Bluetooth module of each of the tires, a first radio frequency signal in response to an instruction, where the first radio frequency signal comprises a field for calculating the angle of arrival;
receiving the first radio frequency signal by alternately using two antennas of the second Bluetooth module;

sampling the field for calculating the angle of arrival in the first radio frequency signal, to obtain I/Q data corresponding to the two antennas;

obtaining, based on the I/Q data corresponding to the two antennas, a phase difference of the first radio frequency signal reaching the two antennas; and calculating, based on the phase difference, the angle of arrival of the first Bluetooth module relative to the second Bluetooth module.

In an embodiment, the tire localization method further includes:

determining, for each of the tires, whether a tire belongs to a front tire group or a rear tire group based on the angle of arrival of the first Bluetooth module in each tire relative to the second Bluetooth module; and determining, for each of two tires in the front tire group or the rear tire group, whether a tire is a left tire or a right tire based on a phase relationship between an X-axis component of the magnetic field intensity in the tire and a Y-axis component of the magnetic field intensity in the tire.

In an embodiment, in a case where a straight line formed by the two antennas of the second Bluetooth module is parallel to a longitudinal direction of a body of the vehicle, the corresponding tire is determined to belong to the rear tire group in response to an absolute value of the angle of arrival being less than 90 degrees; and the corresponding tire is determined to belong to a front tire group in response to the absolute value of the angle of arrival being greater than 90 degrees.

In an embodiment, in a case where a straight line formed by the two antennas of the second Bluetooth module is perpendicular to a longitudinal direction of body of the vehicle, the corresponding tire is determined to belong to the rear tire group when the angle of arrival is a negative value; and the corresponding tire is determined to belong to a front tire group when the angle of arrival is a positive value.

In an embodiment, the tire localization method further includes:

determining, for each of the tires, whether a tire belongs to a left tire group or a right tire group based on a phase relationship between an X-axis component of the magnetic field intensity in the tire and a Y-axis component of the magnetic field intensity in the tire; and determining, for each of two tires in the left tire group or the right tire group, whether a tire is a front tire or a rear tire based on the angle of arrival of the first Bluetooth module in the tire relative to the second Bluetooth module.

In an embodiment, in a case where a straight line formed by two antennas of the second Bluetooth module is parallel to a longitudinal direction of a body of the vehicle, among two angles of arrival corresponding to the left tire group or the right tire group, a tire corresponding to an angle of arrival with a larger absolute value is a front tire; and a tire corresponding to an angle of arrival with a smaller absolute value is a rear tire.

In an embodiment, in a case where a straight line formed by two antennas of the second Bluetooth module is perpendicular to a longitudinal direction of a body of the vehicle, among two angles of arrival corresponding to the left tire group or the right tire group, a tire corresponding to a negative angle of arrival is determined to be a rear tire, and a tire corresponding to a positive angle of arrival is determined to be a front tire.

In a second aspect of the present disclosure, a tire pressure monitoring module of a vehicle is provided. The tire pressure monitoring module includes a first Bluetooth module and a magnetometer.

The first Bluetooth module is configured to communicate with a second Bluetooth module of a Bluetooth host in the vehicle, where the first Bluetooth module includes at least one antenna and supports Bluetooth 5.1 and above protocols.

The magnetometer is configured to acquire components of magnetic field intensity in at least two different directions in a tire of the vehicle.

A position of the tire is determined based on an angle of arrival of the first Bluetooth module relative to the second Bluetooth module and the components of the magnetic field intensity in at least two different directions.

In an embodiment, magnetometers mounted in tires have a same mounting orientation before the tires are mounted to the vehicle.

In an embodiment, the tire is determined to be a left tire or a right tire based on a phase relationship between an X-axis component and a Y-axis component of the magnetic field intensity from the magnetometer in the tire.

In an embodiment, the first Bluetooth module is configured to acquire data from the magnetometer at a preset time interval, to obtain information on change of the magnetic field intensity in one rotation of the tire.

In an embodiment, the first Bluetooth module is configured to transmit a first radio frequency signal, wherein the first radio frequency signal comprises a field for calculating the angle of arrival.

In an embodiment, the tire is determined to be a front tire or a rear tire based on the angle of arrival of the first Bluetooth module relative to the second Bluetooth module.

In an embodiment, the tire pressure monitoring module further includes multiple sensors and a signal processing module.

The sensors are configured to acquire parameter information in the tire and transmit the parameter information to the first Bluetooth module to monitor state of the tire.

The signal processing module is configured to process the data acquired by the magnetometer and the parameter information acquired by the sensors, and transmit the processed data and the processed parameter information to the first Bluetooth module.

In a third aspect of the present disclosure, a tire localization system of a vehicle is provided. The system includes multiple tire pressure monitoring modules and a Bluetooth host.

The tire pressure monitoring modules are mounted on respective tires of the vehicle, where each of the tire pressure monitoring modules includes a first Bluetooth module configured to transmit a radio frequency (RF) signal and a magnetometer configured to acquire components of a magnetic field intensity in at least two different directions in a tire where the tire pressure monitoring module is mounted.

The Bluetooth host includes a second Bluetooth module and a processing unit. The second Bluetooth module is configured to communicate with the first Bluetooth modules in the tires, and the second Bluetooth module has at least two antennas and supports Bluetooth 5.1 and above protocols. The processing unit is configured to determine positions of the tires based on the components of the magnetic field intensity in at least two different directions in the tires and angles of arrival, AOAs, of the first Bluetooth modules relative to the second Bluetooth module.

In an embodiment, the magnetometers mounted in the tires have a same mounting orientation before the tires are mounted to the vehicle.

In an embodiment, the Bluetooth host is mounted at a center console of the vehicle.

In an embodiment, the second Bluetooth module is configured to, for each of the tires, receive first data sent by the first Bluetooth module in each tire, to obtain information on change of the magnetic field intensity in one rotation of the tire, wherein the first data comprises data representing an X-axis component of the magnetic field intensity and a Y-axis component of the magnetic field intensity in a corresponding tire.

In an embodiment, the processing unit is configured to determine, for each of the tires, whether a tire is a left tire or a right tire based on a phase relationship between the X-axis component of the magnetic field intensity and the Y-axis component of the magnetic field intensity in the tire.

In an embodiment, the second Bluetooth module is configured to receive, in an I/Q sampling mode, a first radio frequency, RF, signals from the first Bluetooth module by alternately using two antennas, wherein the first RF signals comprises a field for calculating the AOA.

In an embodiment, the processing unit is configured to: for each of the tires, obtain the angle of arrival of the first Bluetooth module of the tire relative to the second Bluetooth module based on a phase difference of the first RF signal reaching the two antennas; and determine whether the tire is a front tire or a rear tire based on magnitude of the AOA.

In an embodiment, the processing unit is configured to:
  determine, for each of the tires, whether a tire belongs to a front tire group or a rear tire group based on the angle of arrival of the first Bluetooth module in each tire relative to the second Bluetooth module; and
  determine, for each of two tires in the front tire group or the rear tire group, whether a tire is a left tire or a right tire based on a phase relationship between an X-axis component of the magnetic field intensity in the tire and a Y-axis component of the magnetic field intensity in the tire.

In an embodiment, the processing unit is configured to:
  determine, for each of the tire, whether a tire belongs to a left tire group or a right tire group based on a phase relationship between an X-axis component of the magnetic field intensity in the tire and a Y-axis component of the magnetic field intensity in the tire; and
  determine, for two tires in the left tire group or the right tire group, whether a tire is a front tire or a rear tire, by comparing magnitudes of the angles of arrival of the first Bluetooth modules relative to the second Bluetooth module.

In summary, according to the embodiments of the present disclosure, each of tires is determined to be a left tire or a right tire based on a phase relationship of components of magnetic field intensity in two different directions, where the components of magnetic field intensity are measured by a magnetometer in a tire pressure monitoring module of a tire. The tire is determined to be a front tire or a right tire based on an angle of arrival (AOA) of a first Bluetooth module in the tire pressure monitoring module of a tire relative to a multi-antenna Bluetooth host. In this way, an automatic positioning of tires of a vehicle is realized with a high precision. In addition, the tire pressure monitoring module may be mounted on any tire without any distinction, which reduces the installation cost.

BRIEF DESCRIPTION OF THE DRAWINGS

The above and other objectives, features and advantages of the present disclosure will become more apparent from the following description of embodiments of the present disclosure with reference to the accompanying drawings, in which.

DETAILED DESCRIPTION

The present disclosure is described below based on embodiments. However, the present disclosure is not limited to these embodiments. In the following detailed description of the present disclosure, some specific details are described. Those skilled in the art can fully understand the present disclosure without the description of these details. Well-known methods, processes, flows, components and circuits are not described in detail in order to avoid obscuring the essence of the present disclosure.

In addition, those skilled in the art should understand that the drawings provided herein are for illustrative purpose, and are unnecessarily drawn to scale.

In addition, it should be understood that in the following description, a "circuit" refers to a conductive loop formed by at least one element or sub-circuit through electrical connection or electromagnetic connection. In a case where an element or circuit is described as "being connected to" another element or "being connected between" two nodes, the element or circuit is coupled or connected to another element directly or via other element. A connection between the elements may be physical, logical, or a combination thereof. In addition, in a case where an element is described as "being directly coupled to" or "directly connected to" another element, there is no element between the two elements.

Unless clearly required by the context, words such as "include", "comprise" and the like throughout the description and claims should be construed in an inclusive rather than an exclusive or exhaustive sense; that is, indicating "include but not limited to".

In the description of the present disclosure, it should be understood that the terms "first", "second" and the like are used for descriptive purposes only, and should not be construed as indicating or implying relative importance. Besides, in the description of the present disclosure, unless otherwise specified, "plurality/multiple" means two or more.

Figure 1:
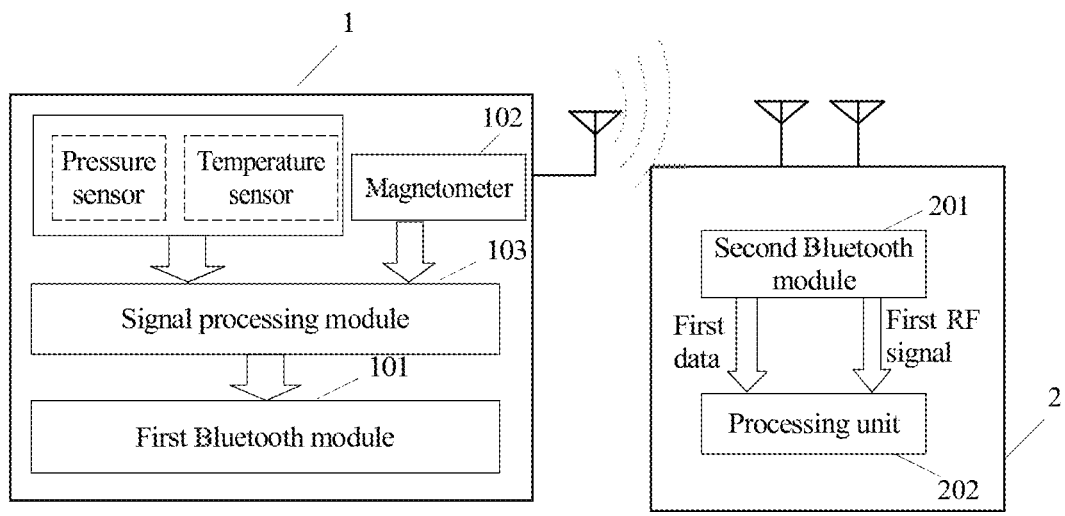
FIG. 1 is a schematic diagram of a tire localization system according to an embodiment of the present disclosure.

FIG. 1 is a schematic diagram of a tire localization system according to an embodiment of the present disclosure. As shown in FIG. 1, the system includes multiple tire pressure monitoring modules 1 and a Bluetooth host 2. One tire pressure monitoring module 1 is mounted on one tire. It should be understood that the tire pressure monitoring module 1 here may be mounted on any of the tires without any distinction.

In an example, the tire pressure monitoring module 1 includes a first Bluetooth module 101, a magnetometer 102, and multiple sensors for acquiring parameters of the tire. The sensors for example include a pressure sensor and a temperature sensor, as shown in FIG. 1. The first Bluetooth module 101 is configured to collect and forward information, which supports Bluetooth 5.1 and above protocols. The first Bluetooth module 101 includes at least one antenna, and the following embodiments are described by taking a single antenna as an example.

The magnetometer 102 is configured to acquire magnetic field intensity within a tire. In an embodiment, the magnetometer 102 is configured to acquire components of the magnetic field intensity in at least two different directions. Magnetic field intensity variation curves are respectively formed based on the acquired components of the magnetic field intensity in at least two different directions. The tire is determined to be a left tire or a right tire based on a phase relationship of the magnetic field intensity variation curves. For a dual-axis magnetometer, the acquired components of the magnetic field intensity include an X-axis component and a Y-axis component of the magnetic field intensity. For a triple-axis magnetometer, the acquired components of the magnetic field intensity include any two of an X-axis component, a Y-axis component, and a Z-axis component of the magnetic field intensity. For example, the acquired components include the X-axis component and the Y-axis component, the X-axis component and the Z-axis component, and the Y-axis component and the Z-axis component.

The first Bluetooth module 101 is configured to acquire data from the magnetometer 102 at a preset time interval, to obtain information on changes in the magnetic field intensity in one rotation of the tire.

In an embodiment, the tire pressure monitoring module 1 further includes a signal processing module 103. The signal processing module 103 is configured to perform processing, such as reshaping, amplifying, and analog-to-digital conversion, on obtained data representing the components of the magnetic field intensity to obtain first data; and transmit the first data to the first Bluetooth module 101. Then, the first Bluetooth module 101 transmits the first data to the Bluetooth host 2 wirelessly.

The Bluetooth host 2 includes a second Bluetooth module 201 and a processing unit 202. The second Bluetooth module 201 is configured to communicate with the first Bluetooth module 101 in a wireless manner. The processing unit 202 is configured to perform an automatic tire positioning procedure for the vehicle based on the components of the magnetic field intensity in two different directions in the tire and the angle of arrival (AOA) of the first Bluetooth module 101 relative to the second Bluetooth module 201.

In an embodiment, the second Bluetooth module 201 includes multiple antennas and supports Bluetooth 5.1 and above protocols. In an embodiment of the present disclosure, a position of the Bluetooth host 2 is not limited, and the Bluetooth host 2 may be mounted at any position among the four tires. In an example, the Bluetooth host 2 is mounted in a center console inside the vehicle.

In an implementation, the second Bluetooth module 201 is configured to receive the first data from the first Bluetooth module 101, to obtain information of change in the X-axis component and Y-axis component of the magnetic field intensity in one rotation of the tire. The first data includes data indicating the components of the magnetic field intensity in the tire in an X axis direction and in a Y axis direction. The processing unit 202 is configured to determine whether the tire is a left tire or a right tire base on a phase relationship between the X-axis component of the magnetic field intensity in the tire and the Y-axis component of the magnetic field intensity in the tire.

Starting from Bluetooth 5.1, a direction finding mechanism has been introduced into the protocol. The second Bluetooth module 201 has at least two antennas which can receive radio frequency (RF) signals sent by the first Bluetooth module 101 in a time-sharing manner according to certain rules. In this case, the same RF signal received by the different antennas can have a phase difference, and then the angle of arrival (AOA) of the first Bluetooth module 101 relative to the second Bluetooth module 201 may be obtained based on the phase difference. In this way, a position of the first Bluetooth module 101 is determined.

For the tire localization system, only an orientation, rather than specific location information, of the first Bluetooth module 101 needs to be obtained. Therefore, the present disclosure is described with a second Bluetooth module with two antennas as an example, in order to reduce costs. It should be understood that the second Bluetooth module with a multi-antenna array is also applicable to the present disclosure.

In addition, according to the Bluetooth 5.1 protocol specification, the second Bluetooth module 201 is configured to alternately use two antennas to receive a first RF signal sent by the first Bluetooth module in an I/Q sampling mode. The first RF signal includes a field for calculating the AOA. The processing unit 202 is configured to obtain the AOA of the first Bluetooth module 101 relative to the second Bluetooth module 201 based on a phase difference between the first RF signals reaching the two antennas, and determine whether the tire is a front tire or a rear tire based on each AOA.

In this embodiment, the processing unit 202 may execute a corresponding positioning procedure based on the first data received by the second Bluetooth module 201, to determine whether the tire is the left tire or the right tire, where the first data includes data representing components of the magnetic field intensity in the tire at least two different directions; and perform I/Q operation on the first RF signal received by the second Bluetooth module 201 to obtain the phase difference between the first RF signal reaching the two antennas, in order to obtain the angle of arrival of the first Bluetooth module relative to the second Bluetooth module; and perform a corresponding positioning procedure to determine whether the tire is the front tire or the rear tire. In this way, each of the tires in the vehicle positioning is completed.

After the tire positioning is completed, multiple sensors, such as the pressure sensor and the temperature sensor, in the tire pressure monitoring module 1 are configured to collect parameter information (such as pressure and temperature) of the tire and transmit the parameter information to the first Bluetooth module 101. Similarly, the parameter information may be processed by the signal processing module 103 for reshaping, amplification, analog-to-digital conversion, or the like to obtain second data; and then transmitted the second data representing parameter information (such as pressure and temperature) of the tire to the first Bluetooth module 101. The second data is then transmitted from the first Bluetooth module 101 to the Bluetooth host 2 in a wireless manner.

It should be noted that wireless communication between the first Bluetooth module 101 and the second Bluetooth module 201 is performed through Bluetooth to transmit and receive information. The second Bluetooth module 201 may simultaneously receive data from multiple first Bluetooth modules 101 in a broadcasting manner, in the case of no connection, i.e., the first Bluetooth module and the second Bluetooth module have not established a connection. Alternatively, the second Bluetooth module 201 may receive data from one of the multiple first Bluetooth modules 101 in a connection-oriented manner, i.e., a connection established between the second Bluetooth module 201 and the one of the multiple first Bluetooth modules 101. In an embodiment, the first Bluetooth module 101 may transmit the RF signal to the second Bluetooth module 201 in any of the broadcasting manner or the connection-oriented manner, which is not limited herein. In some embodiments, the first RF signal and the first data representing the magnetic field intensity are received by the second Bluetooth module 201 in the connection-oriented manner, to ensure data stability. The second data representing temperature, pressure, and the like are received by the second Bluetooth module 201 in the broadcasting manner, to reduce power consumption of the system.

Figure 2:
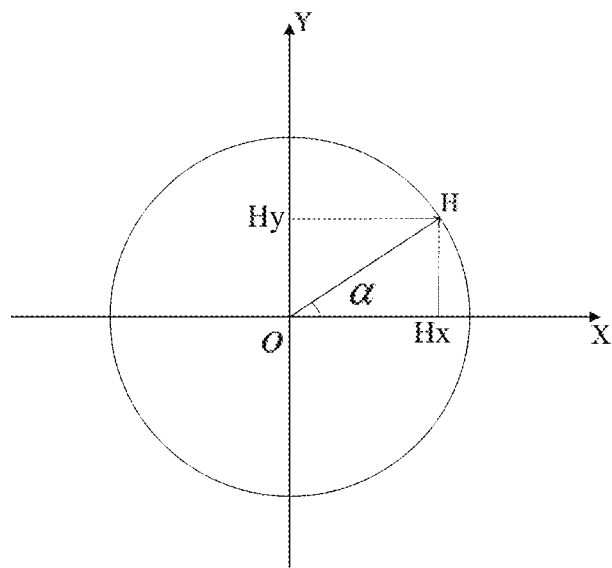
FIG. 2 is a schematic diagram showing a measurement principle of a dual-axis magnetometer according to an embodiment of the present disclosure.

FIG. 2 is a schematic diagram showing a measurement principle of a dual-axis magnetometer according to an embodiment of the present disclosure. The magnetometer 102 may be used to measure an intensity and direction of the magnetic field, in order to realize an approximate positioning of a tire. A vehicle body has a complex distribution of magnetic field. Ferromagnetic substances, such as an on-board electronic device, an engine, and a rigid vehicle body, may all generate magnetic fields. In addition, Earth magnetic field is coupled with the magnetic field of the vehicle body. Therefore, it is a difficult project to perform an accurate spatial modeling for the magnetic field of the vehicle body. According to the solution of the present disclosure, an approximate positioning of a tire is realized by using the magnetometer 102 to measure a magnetic field distribution around the tire. Thus, there is no need to consider the magnetic field distribution model of the vehicle body. The magnetometer 102 measures intensity of a compound magnetic field in real time during rotation of the tire, which simplifies the problem of tire positioning with a magnetometer.

In addition, since an absolute intensity of the magnetic field is not a main factor for positioning in the present disclosure, it may be assumed that the magnetic field intensity measured by the magnetometer during the rotation of the tire is generally maintained in an acceptable range. That is, it is assumed that the measured intensity of the magnetic field measured by the magnetometer of each tire is all the same, which is a certain constant value. Based on this, it may be known that components $H_x$ and $H_y$ of a projection H of a compound magnetic field intensity on a horizontal plane in an X axis direction and a Y axis direction at any time instant may be calculated as:

$$\begin{cases} H_x = H\cos(\alpha) \\ H_y = H\sin(\alpha) \end{cases}. \quad (1)$$

In the formula (1), $\alpha$ represents an angle of the projection H of the compound magnetic field intensity on a horizontal plane relative to the X axis.

Since $\alpha$ changes periodically with a circular motion of the tire during the rotation of the tire, the components in the X axis direction and the Y axis direction measured by the magnetometer 102 may be further expressed as:

$$\begin{cases} H_x(t) = H\cos(\alpha) \\ H_y(t) = H\sin(\alpha) \end{cases}, \alpha = \omega t \Rightarrow \begin{cases} X(t) = H\cos(\omega t) \\ Y(t) = H\sin(\omega t) \end{cases}, \alpha = \omega t. \quad (2)$$

In the formula (2), $\omega$ represents an angular velocity of the tire rotation.

Figures 3A, 3B:
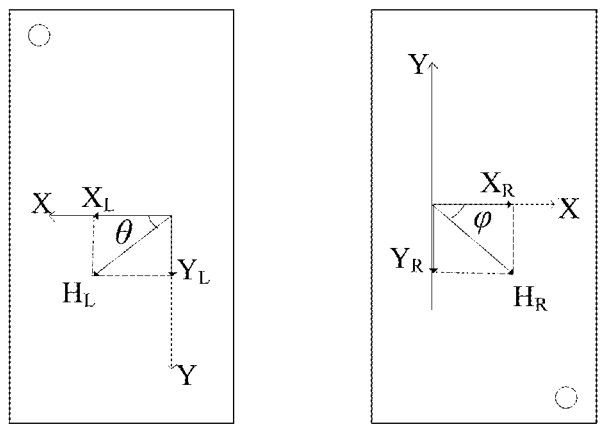
FIG. 3(a) and FIG. 3(b) are schematic diagrams showing magnetic field intensity in different tires according to an embodiment of the present disclosure.

FIG. 3($a$) and FIG. 3($b$) are schematic diagrams showing magnetic field intensity in different tires according to an embodiment of the present disclosure. The tire pressure monitoring module 101 including the magnetometer is mounted on a surface of a tire hub in a tire production process. For respective tires, all magnetometers are mounted along the same preset default mounting orientation. Therefore, installations of the magnetometers on the respective tires are the same in the tire production process. It is not necessary to distinguish between a left tire and a right tire, avoiding man-made error in installation. Here, the default mounting orientation is defined as the X axis pointing to the left and the Y axis pointing down, as an example. In the tire installation process, an X/Y-axis direction of the magnetometers of two left tires after the two left tires are installed is shown in FIG. 3($a$). In an installation process of the right tires, and the right tires may be regarded as being installed by rotating 180 degrees with respect to the left tires, and therefore the X axis and the Y axis of the magnetometers for the right tires, as shown in FIG. 3($b$), are center-symmetric to the X axis and the Y axis of the magnetometers for the left tires. That is, the X axis points to the right and the Y axis points up. Since the magnetic field intensity is represented by a vector, which represents both magnitude and direction of the magnetic field intensity. Thus, components of the magnetic field intensity of a left tire in the X axis and the Y axis have different directions than the components of the magnetic field intensity of a right tire in the X axis and the Y axis. Therefore, a tire may be determined to be a left tire or a right tire by comparing a phase relationship of curves formed by an X-axis component and a Y-axis component of the magnetic field intensity from magnetometers in difference tires.

Referring to FIG. 3($a$) and FIG. 3($b$), considering influence of various magnetic fields in an actual situation, the direction of the magnetic field intensity $H_L$ of a left tire on the horizontal plane directs to the lower left, and the direction of the magnetic field intensity $H_R$ of a right tire on the horizontal plane directs to the lower right. Therefore, the components of the magnetic field intensity $H_L$ of the left tire on the X axis and the Y axis of the magnetometer 102 is expressed as:

$$\begin{cases} X_L(t) = |H_L|\cos(\omega_L t) \\ Y_L(t) = |H_L|\sin(\omega_L t) \end{cases}, \theta = \omega_L t \Rightarrow \begin{cases} X_L(t) = |H_L|\cos(\omega_L t) \\ Y_L(t) = |H_L|\cos\left(\omega_L t - \frac{\pi}{2}\right) \end{cases}. \quad (3)$$

The components of the magnetic field intensity $H_R$ of the right tire on the X axis and the Y axis of the magnetometer 102 is expressed as:

$$\begin{cases} X_R(t) = |H_R|\cos(\omega_R t) \\ Y_R(t) = -|H_R|\sin(\omega_R t) \end{cases}, \varphi = \omega_R t \Rightarrow \begin{cases} X_R(t) = |H_R|\cos(\omega_R t) \\ Y_R(t) = |H_R|\cos\left(\omega_R t + \frac{\pi}{2}\right) \end{cases}. \quad (4)$$

In the formulas (3) and (4), θ represents an angle between the magnetic field intensity $H_L$ and the X-axis direction, WL represents an angular velocity of the left tire, φ represents the angle between the magnetic field intensity $H_R$ and the X-axis direction, and $\omega_R$ represents the angular velocity of the right tire.

Figure 4:
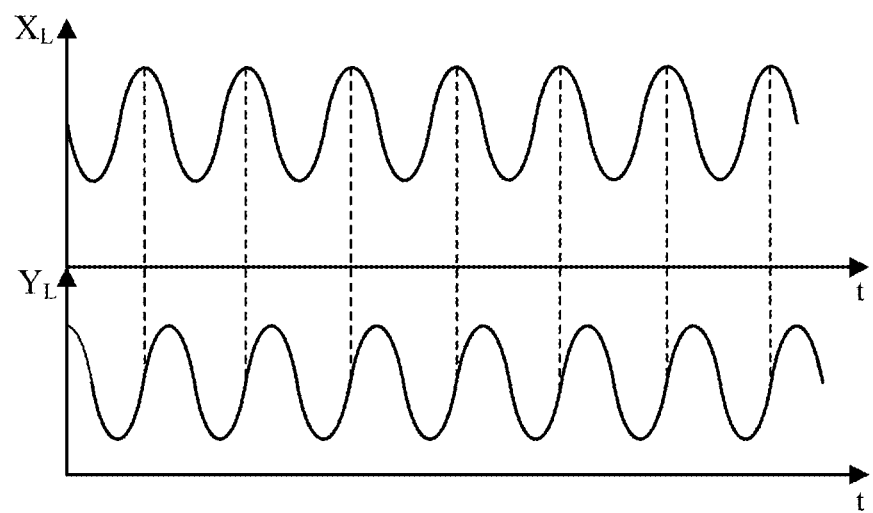
FIG. 4 is a graph of magnetic field intensity based on data from a magnetometer of a left tire according to an embodiment of the present disclosure.
Figure 5:
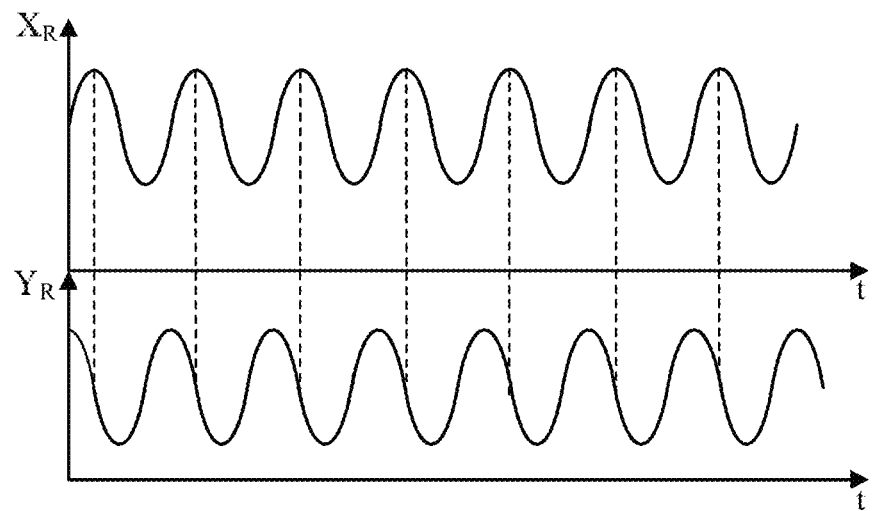
FIG. 5 is a graph of magnetic field intensity based on data from a magnetometer of a right tire according to an embodiment of the present disclosure.

FIG. 4 is a graph of magnetic field intensity based on data from a magnetometer of a left tire according to an embodiment of the present disclosure. FIG. 5 is a graph of magnetic field intensity based on data from a magnetometer of a right tire according to an embodiment of the present disclosure. According to equations (3) and (4), and in combination with FIG. 4 and FIG. 5, for the magnetometer of the left tire, a curve of the X-axis component $X_L$ of the magnetic field intensity is ahead of the curve of the Y-axis component $Y_L$ of the magnetic field intensity. For the magnetometer of the right tire, the curve of the X-axis component $X_R$ of the magnetic field intensity lags behind the curve of the Y-axis component $Y_R$ of the magnetic field intensity. Based on this, it may be determined whether a tire is a left tire or a right tire.

In an example, the first Bluetooth module 101 obtains X-axis data and Y-axis data of the magnetometer at a preset time interval T, so as to obtain multiple different the first data during one rotation of a tire. In an embodiment, the first Bluetooth module 101 continuously acquires the first data N times and then transmits the first data to the second Bluetooth module 201, where N is equal to 2πR/(V×T), R represents a radius of the tire and V represents a vehicle speed. The second Bluetooth module 201 transmits the first data to the processing unit 202. The processing unit 202 finds an extreme point (a maximum point or a minimum point) from the X-axis data of the magnetometer and determines a position (i.e., a serial number) of the extreme point among the N first data. For example, the maximum value is the 10th data among the collected first data. Then, the processing unit 202 determines whether a slope of the Y axis data of the magnetometer at the same position is a positive or negative value. That is, the processing unit 202 determines the slope of the 10th data of the Y-axis data. It should be understood that there are many ways to determine whether the slope is a positive or negative value. For example, the slope may be determined to be a positive or negative vale according to comparison of adjacent data. A positive slope indicates that the X-axis component is ahead of the Y-axis component, and the tire is determined to be the left tire. A negative slope indicates that the X-axis component lags behind the Y-axis component, and the tire is determined to be the right tire.

It should be understood that the method for determining the phase relationship between the X-axis component and the Y-axis component of the magnetometer is not limited to the above, and other methods for determining the phase relationship between the X-axis component and the Y-axis component shall all within the protection scope of the present disclosure. In addition, in order to ensure an accuracy of the determination, the data of changes in the magnetic field intensity in one rotation of the tire may be periodically obtained for multiple times to carry out multiple determinations. For example, it is considered that the determination is completed after a tire is successfully determined to be the left tire or the right tire for four times.

It should be understood that the embodiments of the present disclosure are described with an example of one default mounting orientation. In the case of another default mounting orientation of the magnetometer, for the magnetometer of the left tire, the X-axis component $X_L$ of magnetic field intensity lags behind the Y-axis component $Y_L$ of the magnetic field intensity; and for the magnetometer of the right tire, the X-axis component $X_R$ of the magnetic field intensity component is ahead of the Y-axis component $Y_R$ of the magnetic field intensity. However, as long as the default mounting orientation of the magnetometer is determined during production, the tire may be determined to be the left tire or the right tire based on the phase relationship between the X-axis component and the Y-axis component of the magnetic field intensity of the magnetometer of the tire. Therefore, the default mounting orientation is not limited in the present disclosure, as long as the tires are all mounted in the same mounting orientation.

In addition, the above embodiments are described by taking a dual-axis magnetometer as an example. Those skilled in the art may understand that in a case of a three-axis magnetometer, the X/Y/Z-axis direction of a left tire is center-symmetrical to that of a right tire. Therefore, a tire of the vehicle may be determined to be the left tire or the right tire based on any two components of the magnetic field intensity in the any two of X/Y/Z-axis direction, which will not be described in detail herein.

Figure 6:
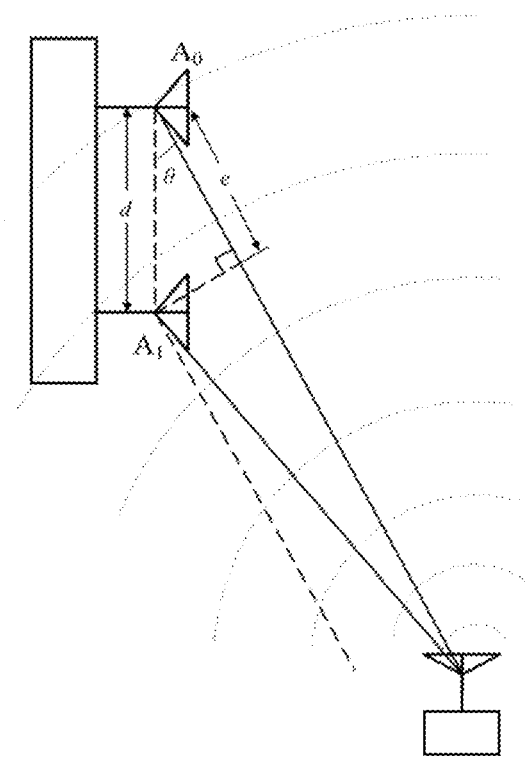
FIG. 6 is a schematic diagram showing a principle of angle of arrival (AOA) estimation according to an embodiment of the present disclosure.

FIG. 6 is a schematic diagram showing a principle of angle of arrival (AOA) estimation according to an embodiment of the present disclosure. In the embodiment of the present disclosure, a straight line formed by two antennas $A_0$ and $A_1$ of the second Bluetooth module 201 is parallel to a longitudinal direction of a vehicle body, and the two antennas are arranged at distance d along the longitudinal direction of the vehicle. It should be understood that an angle of arrival θ of the first Bluetooth module relative to the second Bluetooth module is defined as an angle between a straight line from the first Bluetooth module to the second Bluetooth module (to the antenna $A_0$ of the second Bluetooth module shown in FIG. 6) and a straight line (in a direction of the antenna $A_0$ pointing to the antenna $A_1$) formed by the antenna $A_0$ to the antenna $A_1$ of the second Bluetooth module.

As can be seen from FIG. 6, the following formula is satisfied:

$$\cos\theta = \frac{e}{d} = \frac{\varphi_{diff} \lambda}{2\pi d}. \quad (5)$$

In the formula (5), λ represents a wavelength of the first RF signal, and $\varphi_{diff}$ represents a phase difference between the first RF signal received by the antenna A0 and the first RF signal received by the antenna A1.

In engineering, it is difficult to directly obtain the phase difference $\varphi_{diff}$. Therefore, the phase difference $\varphi_{diff}$ is obtained by I/Q sampling in Bluetooth 5.1 protocol. First, in an I/Q sampling mode, the two antennas $A_0$ and $A_1$ alternatively receive the first RF signal (shown as waves parallel to each other in FIG. 6) sent by each first Bluetooth modules 101, in a switching manner specified by the Bluetooth host 2. Then, I/Q data can be obtained from the received first RF signal, and the phase difference $\varphi_{diff}$ is calculated based on different I/Q data obtained by the two antennas at the same sampling time. Finally, the angle of arrival θ of the first Bluetooth module relative to the second Bluetooth module is calculated according to the phase difference $\varphi_{diff}$.

In an embodiment, when one of the antennas is in a sampling period, the received first RF signal is kept unchanged and is transferred to the processing unit 202 for ADC sampling and filtering, so as to obtain data I. The processing unit 202 may shift the phase angle of data I ahead by 90-degree to obtain data Q, as shown in the following formula:

$$\begin{cases} I = A\cos(\varphi_0) \\ Q = A\cos\left(\varphi_0 - \frac{\pi}{2}\right) = A\sin(\varphi_0) \end{cases} \Rightarrow \varphi_0 = \arctan\frac{Q}{I}. \quad (6)$$

In the formula (6), $\varphi_0$ represents a phase angle of the first RF signal at any moment, and $A\cos(\varphi_0)$ represents the transmitted first RF signal.

Based on different I/Q data obtained by the two antennas in adjacent switching periods, the phase difference $\varphi_{diff}$ between the first RF signal received by the antenna $A_0$ and the first RF signal received by the antenna $A_1$ may be calculated as the follow formula:

$$\varphi_{diff} = \arctan\left(\frac{Q_1}{I_1}\right) - \arctan\left(\frac{Q_2}{I_2}\right). \quad (7)$$

In the formula (7), $I_1$ and $Q_1$ represent the I/Q data collected by the antenna $A_0$ of the second Bluetooth module, and $I_2$ and $Q_2$ represent the I/Q data collected by the antenna $A_1$ of the second Bluetooth module.

In order to further reduce complexity of data processing, the formula (7) may be simplified, by using Euler formula, as:

$$\varphi_{diff} = \arctan\left(\frac{I_2 \cdot Q_2 - I_1 \cdot Q_2}{I_1 \cdot I_2 + Q_1 \cdot Q_2}\right). \quad (8)$$

The formula (8) is substituted into the formula (5) to obtain the angle of arrival θ as follows:

$$\theta = \arccos\frac{\varphi_{diff}\lambda}{2\pi d}. \quad (9)$$

In the formula (9), d represents a distance between the antenna $A_0$ and the antenna $A_1$, and $d \le \lambda/2$.

In addition, to ensure data accuracy, the I/Q data may be acquired multiple times to repeatedly calculate the AOA, and a final value of the AOA may be obtained through a filtering process.

In the above embodiment, the process of acquiring the I/Q data according to the first RF signal is performed by the processing unit 202. It should be understood that in other embodiments, the second Bluetooth module 201 may further include a simple processing module configured to acquire the I/Q data based on the first RF signal.

Figure 7:
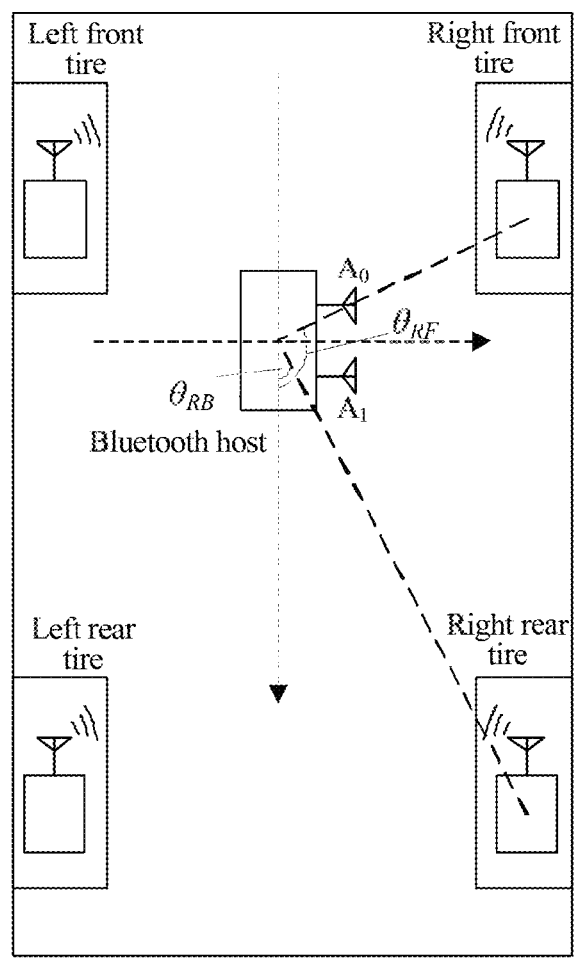
FIG. 7 is a schematic diagram showing a principle of determining whether a tire is a front tire or a rear tire using AOA according to an embodiment of the present disclosure.

FIG. 7 is a schematic diagram showing a principle of determining whether a tire is a front tire or a rear tire using AOA according to an embodiment of the present disclosure. As shown in FIG. 7, the Bluetooth host 2 placed on the center console of the vehicle is taken as an example for description. As shown in FIG. 7, $\theta_{RB}$ represents an angle of arrival of the first Bluetooth module in the right rear tire relative to the second Bluetooth module, and $\theta_{RF}$ represents an angle of arrival of the first Bluetooth module in the right front tire relative to the second Bluetooth module, where $\theta_{RB}$ is less than 90 degrees, and $\theta_{RF}$ is greater than 90 degrees. An angle of arrival of the first Bluetooth module in the left front tire relative to the second Bluetooth module and an angle of arrival of the first Bluetooth module in the left rear tire relative to the second Bluetooth module are both negative values. An absolute value of the angle of arrival of the first Bluetooth module in the left front tire relative to the second Bluetooth module is greater than 90 degrees, and an absolute value of the angle of arrival of the first Bluetooth module in the left rear tire relative to the second Bluetooth module is less than 90 degrees. That is, the angle of arrival of the front tire is greater than the angle of arrival of the rear tire. Specifically, the angles of arrival of the two rear tires are both less than 90 degrees, while the angles of arrival of the two front tires are greater than 90 degrees. Therefore, it can be determined whether the tire belongs to the front tire group or the rear tire group based on the absolute value of the angle of arrival of the first Bluetooth module in each tire relative to the second Bluetooth module.

In some embodiments, the processing unit 202 determines whether the tire belongs to the left tire group or the right tire group based on a phase relationship between an X-axis component of magnetic field intensity and a Y-axis component of magnetic field intensity in each tire. Then the processing unit 202 determines whether the tire is a front tire or a rear tire by comparing the AOAs of the first Bluetooth module in the left tire group or the right tire group relative to the second Bluetooth module. Specifically, among the two AOAs corresponding to the left tire group or the right tire group, the tire corresponding to a larger absolute value of the AOA is determined to be the front tire, and the tire corresponding to a smaller absolute value of the AOA is determined to be the rear tire. In this way, positioning of the tires is completed.

In other embodiments, the processing unit 202 determines whether the tire belongs to the front tire group or the rear tire group based on the AOA of the first Bluetooth module in each tire relative to a second Bluetooth module. Then the processing unit 202 determines whether the tire is a left tire or a right tire based on a phase relationship between an X-axis component of the magnetic field intensity and a Y-axis component of the magnetic field intensity in the left tire group or the right tire group.

In an example, a tire is determined to be the rear tire if an absolute value of the AOA is less than 90 degrees, and the tire is determined to be the front tire if the absolute value of the AOA is greater than 90 degrees.

It should be understood that the two antennas of the Bluetooth host may be placed horizontally, that is, the straight line formed by the two antennas is perpendicular to the longitudinal direction of the vehicle body, and the straight line from the antenna $A_0$ pointing to the antenna $A_1$ directs to right. In this case, the angle of arrival of the first Bluetooth module in a front tire relative to the second Bluetooth module is a positive value, and the angle of arrival of the first Bluetooth module in a rear tire relative to the second Bluetooth module is a negative value. Thus, the tire is determined to be the front tire or the rear tire by determining whether the angle of arrival is a positive value or negative value.

Figure 8:
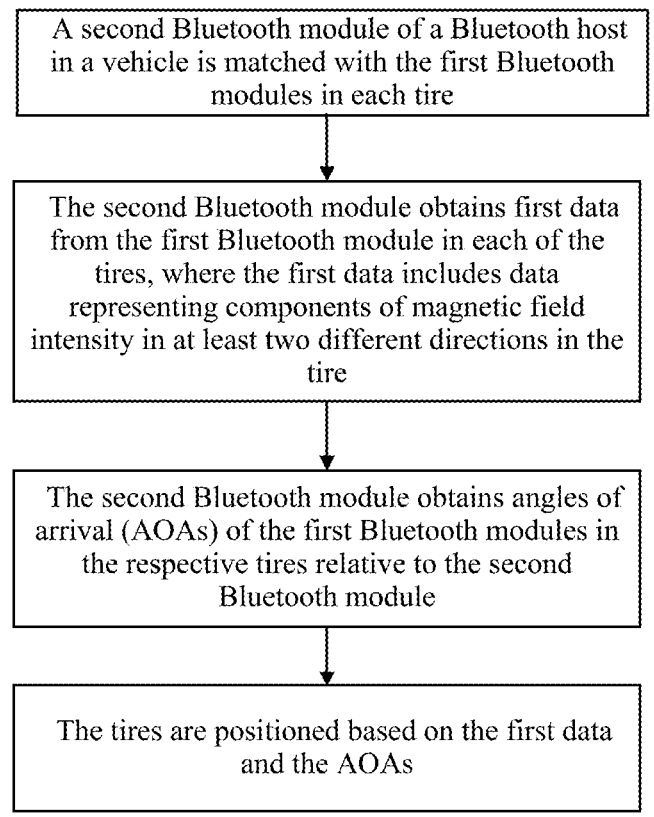
FIG. 8 is a flowchart of a tire localization method according to an embodiment of the present disclosure.

FIG. 8 is a flowchart of a tire localization method according to an embodiment of the present disclosure.

In Step 1, a second Bluetooth module of a Bluetooth host in a vehicle is matched with the first Bluetooth modules in each tire.

In an example, step 1 may include the following steps. First, the first Bluetooth module turns on a broadcast transmission mode to transmit a broadcast signal. The broadcast signal includes a MAC address of the first Bluetooth module and an ID indicating product information. Secondly, the second Bluetooth module turns on a scanning mode to receive and analyze the broadcast signal transmitted by the first Bluetooth module. Then, the second Bluetooth module determines, based on the MAC address and the ID in the broadcast signal, whether the first Bluetooth module is a target device; and records the MAC address and the ID carried in the broadcast signal if the first Bluetooth module is the target device. The above steps are repeated until broadcast signals sent from the first Bluetooth modules of all the four tires is recorded by the second Bluetooth module. Then, the matching is completed.

In step 2, the second Bluetooth module obtains first data from the first Bluetooth module in each of the tires, to obtain information on change of the magnetic field intensity during one rotation of the tires, where the first data includes data representing components of magnetic field intensity in at least two different directions in the tire.

In step 3, the second Bluetooth module obtains angles of arrival (AOAs) of the first Bluetooth modules in the respective tires relative to the second Bluetooth module.

In an example, step 3 further includes the following steps.

The first Bluetooth modules of the tires transmit first radio frequency (RF) signals in response to instructions in sequence, wherein the first RF signals includes a field for calculating the AOA. For each of the first RF signals, the second Bluetooth module alternately receives the first RF signal from the first Bluetooth module of the tire by using two antennas. I/Q sampling is performed on the field for calculating the AOA in the first RF signal to obtain I/Q data. The AOA of the first Bluetooth module relative to the second Bluetooth module is calculated based on the I/Q data.

It should be understood that in this process, the processing unit in the Bluetooth host may acquire the I/Q data according to the first RF signal received by the second Bluetooth module, and perform a filtering processing on the I/Q data to filter out abnormal values. In addition, the AOAs are calculated repeatedly. A stable value of AOA is obtained by performing an averaging processing on the calculated AOAs, to ensure accuracy in calculating the AOA.

In step 4, the tires are positioned based on the first data and the AOAs. In an example, the AOAs and the first data are taken as input parameters. The processing unit determines positions of first Bluetooth modules by executing a positioning procedure. The first data may be used to determine whether the tire is the left tire or the right tire, and the AOAs of the first Bluetooth modules relative to the second Bluetooth module may be used to determine whether the tire is the front tire or the rear tire.

It should be understood that the order of acquiring the first data and the AOAs is not limited, and it is not limited to determine left/right positions of the tires first or to determine front/rear positions of the tires first. Each of the first Bluetooth modules continuously transmits the first data representing the magnetic field intensity from the magnetometer, during an operation of the vehicle. The AOAs are calculated, in response to a command issued from the Bluetooth host, based on the first RF signals transmitted from the respective first Bluetooth modules. Therefore, before the I/Q sampling is started, the second Bluetooth module only receives the first data, and the processing unit starts to execute a procedure of determining left/right positions of the tires. When the first Bluetooth modules transmit the first RF signal, the processing unit may start to determine front/rear positions of the tires. If the first RF signal is transmitted firstly, the processing unit may first determine the front/rear positions of the tires based on the obtained I/Q data, and then determine the left/right positions of the tires based on sufficient first data.

Based on the above steps, each of tires is positioned accurately. Then, the second Bluetooth module instructs, through broadcasting, all the first Bluetooth modules to stop transmitting the first RF signal, and the second Bluetooth module stops obtaining the I/Q data. That is, the process of I/Q sampling does not need to be started again, after positioning of the tires is completed.

After positioning of the tires is completed, each of the first Bluetooth modules transmits real-time data, such as temperature and pressure, collected by the sensors to the second Bluetooth module through broadcasting. In the broadcast mode, each of the first Bluetooth modules may transmit the temperature, pressure and other data of a corresponding tire to the second Bluetooth module at any time. The Bluetooth host may determine whether information of the tire is abnormal, so as to deal with the abnormal situation in time.

In summary, according to the embodiments of the present disclosure, each of tires is determined to be a left tire or a right tire based on a phase relationship of components of magnetic field intensity in two different directions, where the components of magnetic field intensity are measured by a magnetometer in a tire pressure monitoring module. The tire is determined to be a front tire or a right tire based on an AOA of the first Bluetooth module in corresponding tire pressure monitoring module relative to a multi-antenna Bluetooth host. In this way, the tires of a vehicle are positioned automatically with a high precision. In addition, the tire pressure monitoring module may be mounted on any tire without any distinction, which reduces the installation cost.

The above descriptions are only preferred embodiments of the present disclosure, and are not intended to limit the present disclosure. For those skilled in the art, various modifications and changes may be made to the present disclosure, and any modification, equivalent substitution, improvement, and the like, made within the spirit and principle of the present disclosure shall fall within the protection scope of the present disclosure.

The invention claimed is:

1. A tire localization method for a vehicle, comprising:
matching a first Bluetooth module in each tire of the vehicle with a second Bluetooth module of a Bluetooth host in the vehicle;
acquiring first data sent by the first Bluetooth module in each tire, wherein the first data comprises data representing components of magnetic field intensity in at least two different directions in a corresponding tire;
obtaining an angle of arrival of the first Bluetooth module in each tire relative to the second Bluetooth module;
locating each tire based on the first data and the angle of arrival; and
determining, for each of the tires, whether a tire belongs to a front tire group or a rear tire group based on the angle of arrival of the first Bluetooth module in each tire relative to the second Bluetooth module;
wherein in a case where a straight line formed by the two antennas of the second Bluetooth module is parallel to a longitudinal direction of a body of the vehicle,
the corresponding tire is determined to belong to the rear tire group in response to an absolute value of the angle of arrival being less than 90 degrees; and
the corresponding tire is determined to belong to a front tire group in response to the absolute value of the angle of arrival being greater than 90 degrees; or in a case where a straight line formed by the two antennas of the second Bluetooth module is perpendicular to a longitudinal direction of a body of the vehicle, the corresponding tire is determined to belong to the rear tire group when the angle of arrival is a negative value; and the corresponding tire is determined to belong to a front tire group when the angle of arrival is a positive value.

2. The tire localization method according to claim 1, further comprising:

determining, for each of the tires, whether a tire is a left tire or a right tire based on a phase relationship between an X-axis component of the magnetic field intensity and a Y-axis component of the magnetic field intensity in the tire.

3. The tire localization method according to claim 2, further comprising:

acquiring, by the first Bluetooth module, multiple first data for a plurality of times at a preset time interval, to obtain information on change of the magnetic field intensity in one rotation of a tire corresponding to the first Bluetooth module, wherein the first data comprises data representing the X-axis component of the magnetic field intensity and the Y-axis component of the magnetic field intensity; and determining, based on multiple first data, a phase relationship between the X-axis component of the magnetic field intensity and the Y-axis component of the magnetic field intensity.

4. The tire localization method according to claim 3, further comprising:

acquiring N pieces of first data in one rotation of the tire, where N is a positive integer;

determining a position of an extreme point among N pieces of data representing the X-axis component of the magnetic field intensity; and determining, for the N pieces of data representing the Y-axis component of the magnetic field intensity, whether a slope at a same position as the extreme point is a positive value or a negative value, wherein if the slope is a positive value, it indicates that a phase of the X-axis component of the magnetic field intensity is ahead of a phase of the Y-axis component of the magnetic field intensity; and if the slope is a negative value, it indicates that the phase of the X-axis component of the magnetic field intensity lags behind the phase of the Y-axis component of the magnetic field intensity.

5. The tire localization method according to claim 3, further comprising:

determining that the tire is a left tire in a case where a phase the X-axis component of the magnetic field intensity is ahead of a phase of the Y-axis component of the magnetic field intensity; and determining that the tire is a right tire in a case where the phase of the X-axis component of the magnetic field intensity lags behind the phase of the Y-axis component of the magnetic field intensity.

6. The tire localization method according to claim 1, further comprising:

determining, for each of the tires, whether the tire is a front tire or a rear tire based on the angle of arrival corresponding to each tire.

7. The tire localization method according to claim 6, further comprising:

transmitting, by the first Bluetooth module of each of the tires, a first radio frequency signal in response to an instruction, wherein the first radio frequency signal comprises a field for calculating the angle of arrival;

receiving the first radio frequency signal by alternately using two antennas of the second Bluetooth module;

sampling the field for calculating the angle of arrival in the first radio frequency signal, to obtain I/Q data corresponding to the two antennas;

obtaining, based on the I/Q data corresponding to the two antennas, a phase difference of the first radio frequency signal reaching the two antennas; and calculating, based on the phase difference, the angle of arrival of the first Bluetooth module relative to the second Bluetooth module.

8. The tire localization method according to according to claim 1, further comprising:

determining, for each of the tires, whether a tire belongs to a left tire group or a right tire group based on a phase relationship between an X-axis component of the magnetic field intensity in the tire and a Y-axis component of the magnetic field intensity in the tire; and determining, for each of two tires in the left tire group or the right tire group, whether a tire is a front tire or a rear tire based on the angle of arrival of the first Bluetooth module in the tire relative to the second Bluetooth module.

9. The tire localization method according to claim 8, wherein in a case where a straight line formed by two antennas of the second Bluetooth module is parallel to a longitudinal direction of a body of the vehicle, among two angles of arrival corresponding to the left tire group or the right tire group, a tire corresponding to an angle of arrival with a larger absolute value is a front tire; and a tire corresponding to an angle of arrival with a smaller absolute value is a rear tire.

10. The tire localization method according to claim 8, wherein in a case where a straight line formed by two antennas of the second Bluetooth module is perpendicular to a longitudinal direction of a body of the vehicle, among two angles of arrival corresponding to the left tire group or the right tire group, a tire corresponding to a negative angle of arrival is determined to be a rear tire, and a tire corresponding to a positive angle of arrival is determined to be a front tire.

11. A tire pressure monitoring module of a vehicle, comprising:

a first Bluetooth module configured to communicate with a second Bluetooth module of a Bluetooth host in the vehicle, wherein the first Bluetooth module comprises at least one antenna and supports Bluetooth 5.1 and above protocols; and a magnetometer configured to acquire components of magnetic field intensity in at least two different directions in a tire of the vehicle, wherein a position of the tire is determined based on an angle of arrival of the first Bluetooth module relative to the second Bluetooth module and the components of the magnetic field intensity in at least two different directions-;

wherein in a case where a straight line formed by the two antennas of the second Bluetooth module is parallel to a longitudinal direction of a body of the vehicle, the corresponding tire is determined to belong to the rear tire group in response to an absolute value of the angle of arrival being less than 90 degrees; and the corresponding tire is determined to belong to a front tire group in response to the absolute value of the angle of arrival being greater than 90 degrees; or in a case where a straight line formed by the two antennas of the second Bluetooth module is perpendicular to a longitudinal direction of a body of the vehicle, the corresponding tire is determined to belong to the rear tire group when the angle of arrival is a negative value; and the corresponding tire is determined to belong to a front tire group when the angle of arrival is a positive value.

12. The tire pressure monitoring module according to claim 11, wherein magnetometers mounted in tires have a same mounting orientation before the tires are mounted to the vehicle.

13. The tire pressure monitoring module according to claim 11, wherein the tire is determined to be a left tire or a right tire based on a phase relationship between an X-axis component and a Y-axis component of the magnetic field intensity from the magnetometer in the tire.

14. The tire pressure monitoring module according to claim 11, wherein the first Bluetooth module is configured to acquire data from the magnetometer at a preset time interval, to obtain information on change of the magnetic field intensity in one rotation of the tire.

15. The tire pressure monitoring module according to claim 11, wherein the first Bluetooth module is configured to transmit a first radio frequency signal, wherein the first radio frequency signal comprises a field for calculating the angle of arrival.

16. The tire pressure monitoring module according to claim 15, wherein the tire is determined to be a front tire or a rear tire based on the angle of arrival of the first Bluetooth module relative to the second Bluetooth module.

17. A tire localization system of a vehicle, comprising:
a plurality of tire pressure monitoring modules of claim 14, mounted on the tires of the vehicle; and
a Bluetooth host, comprising a second Bluetooth module and a processing unit, wherein
the second Bluetooth module is configured to communicate with the first Bluetooth modules in the tires, and the second Bluetooth module has at least two antennas and supports Bluetooth 5.1 and above protocols; and
the processing unit is configured to determine positions of the tires based on the components of the magnetic field intensity in at least two different directions in the tires and angles of arrival of the first Bluetooth modules relative to the second Bluetooth module.

* * * * *